UNITED STATES PATENT OFFICE.

EMIL TEISLER, OF DOHNA, GERMANY, ASSIGNOR OF ONE-HALF TO ALEX. HUMANN, OF DOHNA, GERMANY.

PROCESS OF MAKING SODIUM-ALUMINUM FLUORID.

1,015,220.  Specification of Letters Patent.  Patented Jan. 16, 1912.

No Drawing.  Application filed January 27, 1910. Serial No. 540,434.

*To all whom it may concern:*

Be it known that I, EMIL TEISLER, a subject of the Emperor of Germany, residing at Dohna, in the bezirk of Dresden and Kingdom of Saxony, Germany, have invented certain new and useful Improvements in Processes of Making Sodium-Aluminum Fluorid; and I do declare the following to be a full, clear, and exact description of the invention, such as will enable others skilled in the art to which it appertains to make and use the same.

This invention relates to a process of making sodium-aluminum fluorid, and has for its object to render the process more expeditious and less expensive.

The production of sodium-aluminum fluorid was heretofore accomplished by allowing soda, alumina and hydrofluoric acid to act on each other in stoechiometric proportions, which causes this double salt to separate out in a very difficulty soluble form. It has also been produced by substituting silico-fluoric (hydrofluosilicic) acid for fluoric acid. Instead of obtaining the fluorin necessary for this process from the hydro-fluoric acid or hydro-silico-fluoric acid, it has been found that the fluorin present in sodium silico-fluorid which is a cheap by-product of the manufacture of super-phosphates, which can be conveniently and completely united with alumina and soda, in which case, it is true, no pure sodium aluminum fluorid results, but a preparation mixed with silicic acid in finely divided form is produced, which, however, although so mixed is found to be useful in the ceramic industry, for the preparation of milk-glass and enamel, as silica forms a large proportion of glasses and enamels.

It is known that soluble fluosilicic compounds and alkali silico fluorids on digesting with alkalis undergo decomposition into alkali fluorids and silicic acid. Previous experiences, however, disclose the fact that this decomposition is incomplete, as the gelatinous silicic acid therein formed acts as a hindrance to prevent complete decomposition. (German patent to Reich, 96,226 corresponding to British patent to Reich, 21073 of 1897.) Therefore, if it is wished to convert alkali silico-fluorids completely into alkali fluorids, the higher temperature of an incandescent process must be used. (Rickmann and Rappe, German Patent 110250.) Furthermore, it is known that soluble silico fluoric compounds are converted gradually by alkaline earths into fluorids and silicic acid. From the meager information on the subject, it cannot be determined whether this process is a complete one, but it seems not to be, in view of the fact that Reich, German Patent, 96,226, heats to incandescence the silico-fluoric salts with lime to produce a complete decomposition. The transformation of the sodium silicofluorid into fluorid seems therefore to have a limit with the production of fluorids of the alkali and earth alkali metals. I have, however, found it is possible, by the use of sodium silico-fluorid, to produce aluminum fluorid also. This transformation does not transpire at a red heat or what are well known as glow temperatures, but occurs at about 100 degrees C. and the reagents must be heated with water and in the finest imaginable comminution and be well mixed with each other. If there be added the quantity of soda necessary for the formation of the sodium-aluminum fluorid, the product of the reaction consists of this double salt mixed with silicic acid and with only traces of sodium silico fluorid. A large number of chemical investigations has confirmed the fact that the double salt is really present and not only a mixture of aluminum fluorid or other aluminous fluorids and sodium fluorid. The alumina necessary for this process is taken either from aluminum oxid, aluminum hydrate, aluminate of soda, bauxite, clay, kaolin or any other suitable source.

The process is explained by the following equation;

$$2Na_2SiFl_6 + Al_2O_3 + Na_2CO_3 = Al_2F_6 6NaF + CO_2 + 2SiO_2$$

Accordingly it will be necessary to employ: 400 kg. sodium silico fluorid, 108.5 kg. anhydrous alumina and 113 kg. soda (carbonate). Hence this improved process consists in combining sodium silico fluorid and alumina both in a finely divided or pulverulent state mixed together in the proportions above stated with water and with the required quantity of sodium carbonate necessary for the formation of sodium aluminum fluorid and heating the mixture to a temperature of approximately 100° C.

Having thus described my invention, what I claim is:

1. The process of making sodium-aluminum fluorid which consists in mixing together sodium-silico-fluorid and alumina in a very finely divided state with water and heating them at approximately 100° C with the addition of the required quantity of sodium carbonate necessary for the formation of the double salt in stoechiemetrical proportion.

2. The process of making sodium-aluminum fluorid which consists in mixing together pulverulent sodium-silico-fluorid 400 kg., pulverulent anhydrous alumina 108.5 kg., soda 113 kg. with water, and at a temperature of about 100° C.

In testimony whereof I have hereunto set my hand in presence of two subscribing witnesses.

EMIL TEISLER.

Witnesses:
PAUL ARRAS,
ULYSSES J. BYWATER.